United States Patent [19]
Woltjen

[11] 4,174,621
[45] Nov. 20, 1979

[54] TORQUE LIMITING OVERLOAD COUPLING

[75] Inventor: Duane W. Woltjen, Manchester, Mo.

[73] Assignee: UMC Industries, Inc., St. Louis, Mo.

[21] Appl. No.: 841,364

[22] Filed: Oct. 12, 1977

[51] Int. Cl.$^2$ .......................... F16D 3/56; F16D 7/00
[52] U.S. Cl. ...................................... 64/29; 192/56 R
[58] Field of Search .......................... 64/29; 192/56 R

[56] References Cited

U.S. PATENT DOCUMENTS

| | | | |
|---|---|---|---|
| 1,541,489 | 6/1925 | Ely | 64/29 |
| 1,566,553 | 12/1925 | Maisch | 64/29 |
| 1,883,164 | 10/1932 | Vassakos | 64/29 |
| 2,818,712 | 1/1958 | Barnes | 64/29 |
| 3,050,965 | 8/1962 | Landrum | 64/29 |
| 3,148,499 | 9/1964 | Tringali | 64/29 |
| 3,722,644 | 3/1973 | Steinhagen | 64/29 |
| 3,774,738 | 11/1973 | Steinhagen | 64/29 |
| 3,942,337 | 3/1976 | Leonard | 64/29 |
| 4,006,608 | 2/1977 | Vuceta | 64/29 |

FOREIGN PATENT DOCUMENTS

| | | | |
|---|---|---|---|
| 2607564 | 9/1976 | Fed. Rep. of Germany | 64/29 |
| 2544919 | 4/1977 | Fed. Rep. of Germany | 64/29 |

*Primary Examiner*—Charles J. Myhre
*Assistant Examiner*—R. C. Turner
*Attorney, Agent, or Firm*—Paul M. Denk

[57] ABSTRACT

A torque limiting overload coupling for use in connecting rotating and rotatable parts together, first and second connectors couple the drive shaft to another shaft, or flange or dial of a machine, such as an indexing machine, a series of bearings are seated intermediate the pair of connectors with an adapter cooperating with one of the connectors for providing a seating of the said bearing, as at one side, while a diaphragm type bearing seat cooperates with spring means for biasing against the bearings and furnishing their seating as against the other connector, and one or more pins interconnect between the first connector and the diaphragmed bearing seat for insuring the simultaneous rotation of both connectors, and their connecting shafts, flanges, or dials, as during normal operation of the designed machinery.

16 Claims, 10 Drawing Figures

TORQUE LIMITING OVERLOAD COUPLING

BACKGROUND OF THE INVENTION

This invention relates generally to shaft coupling means, and more specifically pertains to a bearing interconnecting torque limiting overload coupling for preventing shaft rotation at forces exceeding the designed torque for the operating machinery.

A variety of styles of shaft coupling devices are available in the prior art, and usually are provided for coupling the drive shaft of a motor or speed reducer with a main driven shaft supporting the work component being turned. Many of these coupling devices are constructed in the category of flexible couplings, and any of a variety of connectors that are designed for providing a transmission of rotatable or torque forces from a drive shaft to the intended driven shaft, or the like. In addition, safety means has on occasion been designed into these type of couplings, functioning in the manner of safety devices to prevent the exertion of excessive torque forces upon the driven shaft from damaging the drive shaft and its prime mover, or even from causing damage to the tool actively performing work upon the machinery and exerting the torque in the first instance. Many of these safety devices have been designed in the category of mechanically activated torque couplers, and as can be seen in the United States patent to Schultz, U.S. Pat. No. 2,771,171, a variety of magnetic pole pieces are arranged within a rotor means and normally effect a revolving of a driven member and its axial shaft for furnishing force transmission for rotation of a pair of axial shafts, but yet in the event that excessive force is applied to one of the shafts then the magnetic means is disengaged for curtailing the rotation of the driven shaft. The shown magnetically operated torque coupler of this United States patent, while it may be effective in its operations, it is quite dissimilar from the mechanically actuated torque limiting means of the current invention.

An additional variety of magnetic coupling devices for preventing overload force from being exerted upon a driven shaft, and which finds significant usage in the textile industry, as when spindles of yarn are being wound, and thereby the tension upon the yarns becomes rather critical and when exceeded can cause a break down in its windings, are shown in the United States patents to Cowell, U.S. Pat. No. 3,221,389, and the United States patent to Gollos, U.S. Pat. No. 3,339,819. This latter patent is pertinent for disclosing a series of spherical projections that contact and intermesh with cups formed upon an opposing annular surface, these two separate components being held together through the agency of permanent magnerts.

Further type of magnetic torque limiting devices, and specifically for use in low force operating mechanisms, such as phonograph record players or sound recorders, are shown in the two United States patents to Tiffany, U.S. Pat. No. 1,136,739, and Cornwell, U.S. Pat. No. 2,300,778.

The combination of magnetic couplers having spring biasing to determine the degree of force necessary for disengaging a coupling has also been available in the prior art, as shown in the United States patent to Allen, U.S. Pat. No. 3,053,365. And, other forms of connectors, which generally have utilized the permanent magnet approach for effecting torque control are shown in the additional United States patent to Woolley, U.S. Pat. No. 3,277,669; the United States patent to Hornschuch, et al. U.S. Pat. No. 3,159,725; the U.S. patent to Spodig, U.S. Pat. No. 2,943,216; the United States patent to Beeston, Jr., U.S. Pat. No. 2,885,873; and finally, the United States patent to Hoad, U.S. Pat. No. 2,746,691, which utilizes a frictional connection between magnets for determining the degree of torque necessary to effect discoupling of its torque limiting device.

Various ball detent couplings are available in the art. Some are shown in the U.S. Pats. No. 3,701,404, No. 3,680,673, No. 3,893,553; No. 3,981,382, No. 3,979,925, No. 3,942,238, No. 3,927,537, No. 3,930,382, and No. 3,866,728.

While all of the foregoing disclosures may be effective for achieving their particular intended results within specific types of mechanical devices and apparatuses, the current invention, a hereinafter to be summarized, and described, embodies rather distinct structure that operates rather differently from any of these prior art, and attains rather precise torque limiting connection between not only a shaft to shaft connection, but also between a combination of shafts, flanges, and dials, depending upon the type of industrial machinery comprising the rotating part, and that which is to be rotated.

It is, therefore, the principal object of this invention to provide a totally mechanical torque limiting overload coupler that may be used intermediate rotating and rotatable parts, of different designs, for achieving precise, but yet adjustable, discoupling of such parts when the force of rotating torque exceeds that for which the machinery was designed.

Another object of this invention is the provision of a torque limiting device which incorporates spring means that may be varied in its quantity of usage so as to provide for major adjustments in the degree of torque that may be withstood by the coupler during its application.

In view of the foregoing, it is yet another object of this invention to provide a retainer in the form of a threaded nut that biases against the aforesaid spring means for furnishing a fine adjustment in the degree of torque being withstood by this coupler before its disengagement.

Yet a further object of this invention is the provision of the usage of a combination of bearing means, preferably in the form of ball bearings, and tapered pins, that function to insure connection of the rotating and rotatable parts of machinery together, but which bearings and pins flexurally disconnect from their seats when the maximum torque force is reached and exceeded.

Yet another object of this invention is the provision of an overload coupling which incorporates rather few functioning components, but yet is totally mechanically operative, and does not rely upon any other extraneous force means, such as a magnetic force, other than its purely mechanical coupling which disengages under the influence of excessively applied torque.

A further object of this invention is the provision of a torque limiting overload coupling which is relatively fascile in its adjustment for attaining precise settings for accommodating applied torque forces during usage of machinery.

A further object is to attain a precise repositioning in register between the rotatable and rotating components of a machine.

Another object is to attain a highly reliable operating coupler that is capable of functioning even in the presence of fretting.

These and other objects will become more apparent to those skilled in the art upon reviewing the summary of this invention, and upon undertaking a study of its preferred embodiment in view of the drawings.

SUMMARY OF THE INVENTION

This invention contemplates the construction of a torque limiting device for furnishing a totally mechanically operative overload coupling for, as previously mentioned, attaching rotating and rotatable parts of machinery together. And, due to the unique construction of the interrelated components of this invention, the coupling can be easily adjusted, to within relatively precise limits of the quantity of force or torque that may be accommodated by such machinery before disengagement of the coupling occurs, therefore functioning as a safety mechanism for industrial machinery and tools.

The invention is designed for interconnecting the shaft of a rotating part with the shaft of a rotatable part, or may interconnect a pair of similar type flanges or dials together, or may couple a combination of a shaft to flange or dial, or vice versa. In any event, and throughout the analysis of this invention, it is likely that the legend given to the rotating part, and the rotatable part, of this invention may be interchanged, in that a rotatable part may actually be driven by a prime mover for effecting a revolving of what may be herein described as the rotating component. In any event, the torque limiting coupler of this invention is reversible in its disposition of use within the scope of this invention.

The coupler includes first and second connecting mean that secure respectively to either the rotating and rotatable parts of standard machinery, such as of an indexing machine. It may be commented that the precision essentially derived from an indexing machine relies significantly upon the critical operation of its precisionally machined components, such as in its integral roller gear indexing drive, and if too much force or back pressure is exerted upon such a drive, it may have a tendency to distort or damage its fine construction, rendering it totally inoperative for its intended usage. Therefore, the torque limiting means of this invention, and its first and second connecting means, which are intervened and normally displaced apart by the agency of seated bearing means and cooperating tapering pins, furnishes a rather precisely regulated coupler that can be predetermined for disconnection when a fairly exact degree of torque is encountered. All this can occur without any relative displacement between the said connecting means. The invention has been designed wherein one of its connecting means is readily exposed for securement with either the drive shaft or flange of the prime mover, or from a speed reducer or indexing drive, with all of the other primary components of the coupler being associated with the other rotating or rotatable part of the machinery. Thus, the disassembly or separation of this coupler can easily be accommodated by a simple separation of the components, and without necessitating a piece-mean disassembly of its components, which ordinarily may be easily scattered, upon its disengagement. But, as previously explained, the one connecting means may be directly fastened with either the rotating or rotatable part of the machinery, while the other connecting means, having all of the operating components of this coupler associated therewith, connects wit the remaining machine rotating or rotatable parts.

The two connecting means of this coupler are intervened by an intermediate bearing means, as aforesaid, which includes a retainer having a series of apertures therein, and in which bearings, such as bail bearings, may be seated and held therein between the two said connecting means. The bearings may normally rest directly within mating seats formed within the adjacent surface of one of the connecting means, or within a special adapter formed having precision seats and into which their respective ball bearing may customarily be arranged during normal operation of machinery, with force transmission being effected routinely through this overload coupling device provided the torque limits for the coupler is not exceeded. And, the juxtaposed and other connecting means cooperates with a diaphragm, which may be more specifically identified as a bearing seating means which rests against this other connecting means, and which is biased through the agency of a clamp plate which is urged by a spring means for normally biasing the bearing means into a seating engagement within its respective seating means formed either within the first and second connector means, or their respectively associated bearing seat adapter and diaphragmed like bearing seat. And, since bearings alone seated intermediate two connectors normally do not furnish sufficient force resisting connection between components within an overload coupling for use within major machinery, it has been found desirable to incorporate additional force absorbing means, in the form of pins, that mate within aligned tapered apertures in the diaphragm bearinged seat so as to insure the simultaneous rotation between the rotating and rotatable parts of the machinery, and only when major forces, in the category of 2000 to 10,000 inch-pounds of force are encountered, does the diaphragmed bearinged seat gradually ease away from the bearings and the tapered pins for eventually furnishing rather precisely controlled decoupling of the overload device at a predetermined instance.

DESCRIPTION OF THE PREFERRED EMBODIMENT

Figure 1:
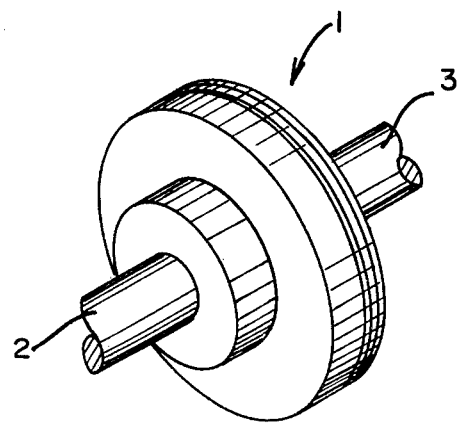
FIG. 1 discloses an isometric view of the torque limiting overload coupling of this invention.
Figure 2:
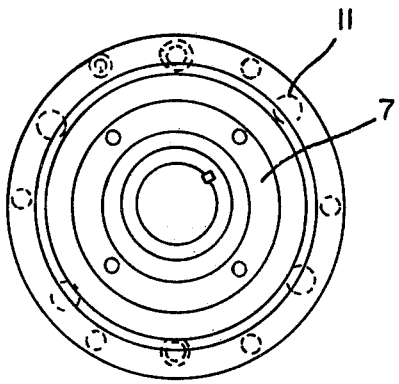
FIG. 2 furnishes a right side view of the coupler shown in FIG. 1.
Figure 3:
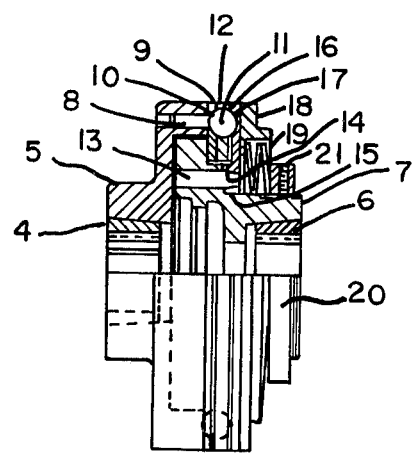
FIG. 3 is a partial sectional side view of the coupler.

In referring to the drawings, and in particular FIGS. 1 through 3, there is shown the overload coupling 1 of this invention. This invention, as shown in this particular embodiment, connects with a pair of shafts 2 and 3, of an item of machinery, and which shafts may be identified as the rotating and rotatably parts interconnected through the agency of the coupling device of this invention. As previously explained, either the shaft 2 or the shaft 3 may comprise the rotating member, as being driven from a prime mover, while the other of said shaft may be the rotatable part, and which may connect to the item of machinery to be turned, such as, for example, an indexing table.

The shaft 2 is disposed for coupling by means of the bushing 4, to the connecting means 5, while the shaft 3 secures by means of the bushing 6 with the connecting means 7 of this coupler. A dowel pin 8 secures an adapter means 9 to the connecting means 5, and this adapter is provided with a series of seats, as at 10, spacedly around its circumference and which are designed for seating of the bearing 11 held by the retainer 12 around the circumference of the coupling device.

The connecting means 7 has a series of pins 13 spacedly arranged within apertures around its midcircumference, and these pins, at their forward ends, are tapered, as at 14, and normally, snugly seat within a corresponding aperture, as at 15, located within a diaphragm type of bearing seating means 16. This seating means 16 also includes a series of beveled cavities, as at 17, therein for seating of the ball bearings 11, as previously explained. Once again, since there are a variety of these ball bearing provided around the circumference of the coupling, there will be a corresponding bearing seat, as at 10, provided within the adapter means 9, and a bearing seat 17, furnished within the diaphragm means 16, for each of the bearing 11, held by the retainer 12, intermediate these two connecting means 5 and 7.

As can also be seen in this FIG. 3, a clamp plate 18 is contiguous against the multibearing seated diaphragm means 16, and a spring 19 urges the said plate forcefully against the said diaphragm and its bearings 11 and the pins 13. An adjustment nut 20 having a socket set screw 21 therein, for tightening purposes, is threaded onto the end of the connecting means 7, and thereby can adjustably bias against the spring 19 for urging it against its contiguous plate 18 and the bearing means of this invention.

Figure 4:
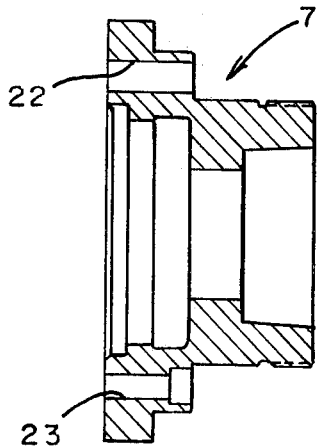
FIG. 4 furnishes a vertical sectional view of the right side connecting means of the coupler shown in FIG. 3.
Figure 5:
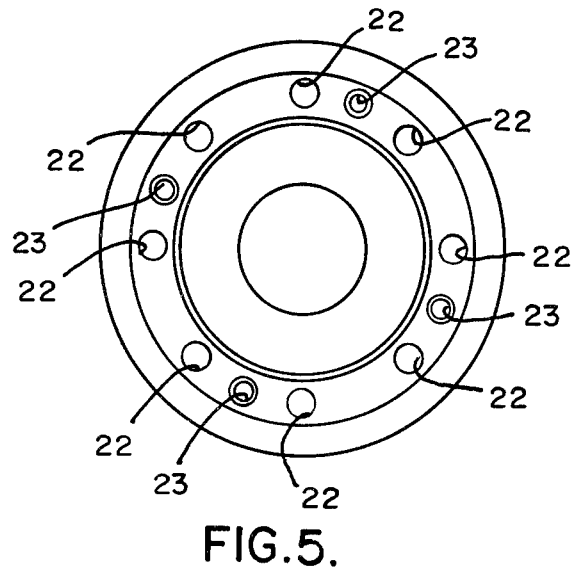
FIG. 5 is a left end view of the connecting means shown in FIG. 4.

As shown in FIGS. 4 and 5, the connecting means 7 includes the series of the spaced apertures, as at 22, and into which the pins 13 insert, with there being approximately eight of said spaced apertures provided around the circumference of this connecting means. Obviously, other number of apertures 22, and corresponding pins 13, may be provided within the operation of this coupler, and in practice, as few as four pins have been found effective in the operations of this coupler. In addition, a series of counterbored holes 23 are also spacedly provided around the circumference of this connector, and useful for connecting a dial means to the same which may be associated with the driving means or driven component of the machinery in which this coupler is utilized.

Figure 6:
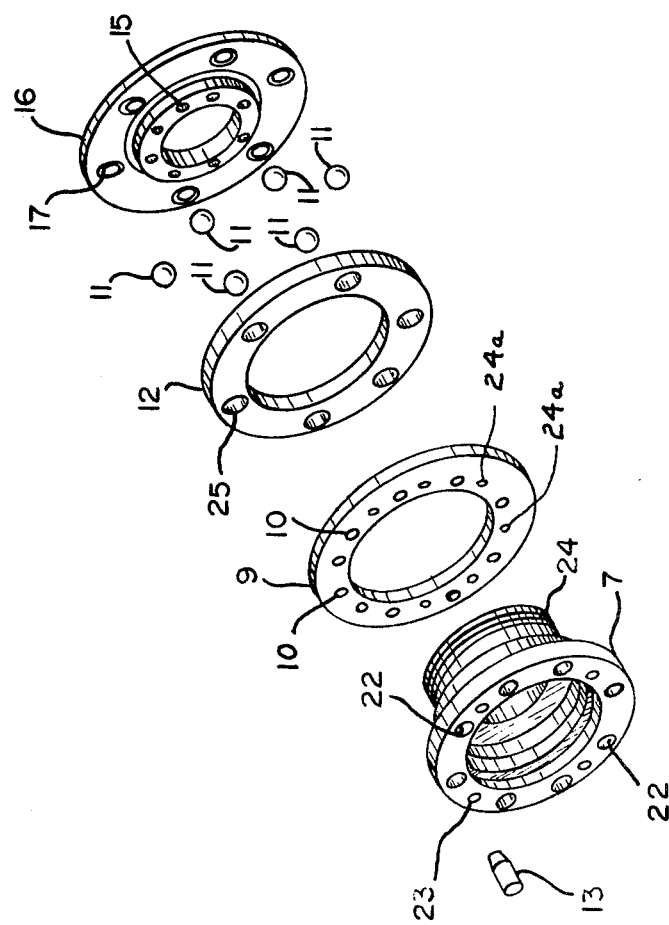
FIG. 6 is an exploded view of the right side connecting means and the various coupler operating components that are disposed thereon during its assembly.

The disposition of these various components during their assembly onto at least the first connecting means 7 or this invention is shown more clearly in FIG. 6. As can be seen, the connector 7 is integrally formed having its threaded end 24, and onto which the adjustment nut 20 threadedly engages at the final assembly and force withstanding adjustment of this coupler. The series of spaced apertures 22 formed around the circumference of the connecting means 7 are each disposed for reception of the tapered pins, one as shown at 13. The adapter means 9 is next insertable onto the connecting means 7, and freely fits thereon so that when disengagement of this coupler is effected, this adapter means, which is rigidly fastened or pinned to one of the rotating or rotatable parts of the machinery, will be reasonably free to turn upon disconnection of the coupler, as when an excessive torque is encountered. This adapter 9 includes a series of bearing seats 10 therein, and also include the additional apertures 24a and into which the dowel pins 8 may insert for retention of this rotating or rotatably part therewith, as previously described. Disposed for next insertion upon the connecting means 7, but being freely rotatable with respect thereto, is the retainer 12, having the spaced apertures 25 and into which the bearing means 11 insert to be captured, having then one exposed side being retained normally within the aligned bearing seats 10, of the adapter 9, as previously explained. The next item that inserts onto the connecting means 7 is the diaphragm means 16 having integrally formed therein the series of aligned bearing seats 17 that provide for seating of the other side of the plurality of ball bearings 11 therein for embracing them intermediate these two components 9 and 16 as explained. The tapered apertures 15 are also shown provided upon this diaphragmed bearing seat means. The clamp plate 18 next inserts contiguously against the back side of the diaphragm means 16, and is urged thereagainst, and therefore, provides for normal retention of the bearings seated within their respective seats of the adapter 9 and the diaphragm 16 under normal operating conditions of this coupler. A plurality of the spring means 19 are held by the adjustment nut 20 against the clamp plate 18, and these spring means have preferably been designed in the form of disc springs, with the number of disc springs utilized depending upon the degree of force that is required to be sustained by the coupler before it separates under overload conditions. Obviously, other forms of spring could be utilized for this spring means 19 of the invention, but disc springs of this type have been found to operate desirably under load conditions, and are more susceptible for ease of adjustment in the quantity of force that may be sustained by this coupler during operation of machinery. Finally, the bushing 6 may insert within the threaded end 24 of the connecting means 7, and therein key either a driving shaft or driven shaft during installation of this coupler.

Figure 7:
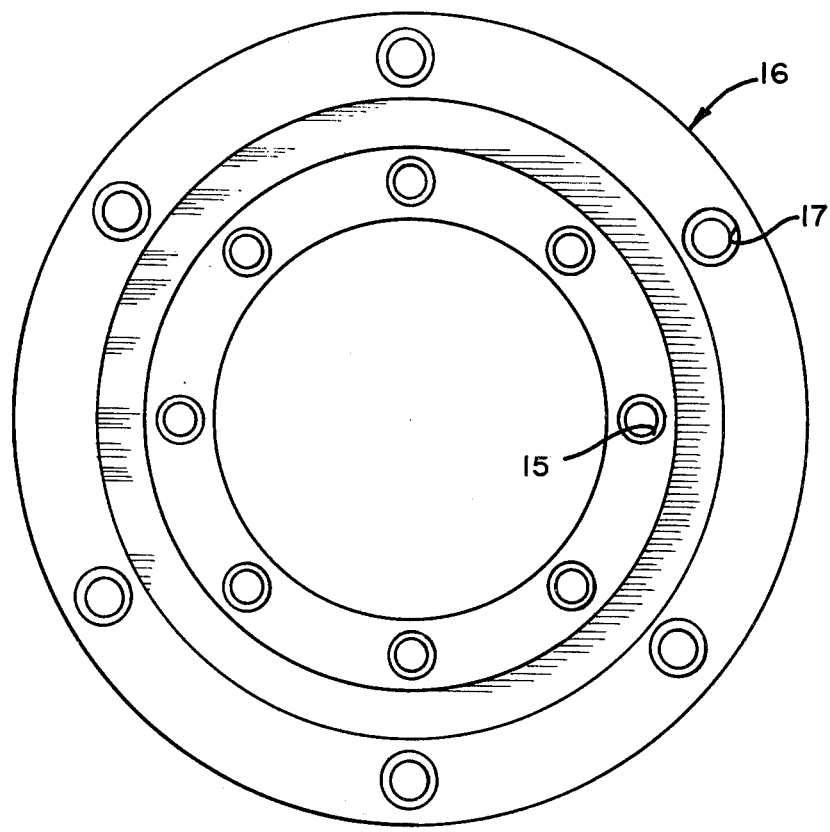
FIG. 7 provides an end view of the diaphragm means of the coupler.
Figure 8:
FIG. 8 provides a partial vertical sectional view from the side of the diaphragm means shown in FIG. 7.

FIGS. 7 and 8 disclose in greater detail the configuration of the diaphragm means 16, and as can be seen, there are six bearing seats 17 provided around its perimeter, each one designed for holding and supporting a side of one of the ball bearings 11. And, there are eight tapered apertures 15 provided therethrough, and into which the tapered ends of the pins 13 are normally inserted for providing retention of the connector means 5 and 7 together during normal installation and operations of the machinery, and within the specified limits of the torque for which this coupler has been adjusted to sustain without disconnection. As previously explained, the usage of bearings alone would not provide sufficient resistance for the coupler to withstand forces in these quantities, and therefore, the supplemental reinforcement of the coupler through the use of the tapered pins 13, seated within the tapered apertures 15 of the diaphragm means, provides for enhancement in the forces withstood by this coupler during its functioning within an item of industrial machinery. Thus, as heavier forces are encountered by this coupler during machinery operation, such forces, as they reach the adjusted limits for the coupler, causes a gradual separation between the adapter means 9 and the diaphragm 16. As this occurs, the diaphragm 16 gradually rises up from its seating upon the pins 13 until that condition prevails when the bearings 11 are totally removed from their said seats, and held in this separate condition by means of their unseated location. Such bearings may also be slightly less in diameter than the length of the tapered and projecting portions 14 of the pins 13 extending from the connecting means 7. Thus, when that condition is reached and prevails, the coupler will have broken down, thereby reducing or preventing further rotation of the rotatable part by means of the rotating part of the machinery. But, in addition, it is necessary that the coupler function precisely during that time when the torque is less than its designed overload limit. Thus, all of the components of this coupler, and particularly its bearings and tapered pins, must snugly fit their mating surfaces under routine operating conditions as within their respective bearing seats and tapered apertures. To insure this, the coupler is preloaded in its assembly, so as to prevent any backlash during its routine operations. This is achieved by providing for a slight clearance, something in the vicinity of one-one thousandth of an inch, between the bearings and their seats 17 and 10 when the coupler is initially assembled but before any spring pressure from the spring means 19 is urged upon the bearings. And, when spring pressure is then applied, the adapter plate and diaphragm means are then snugly urged into contiguous contact with the various bearings 11 and the tapered pins 13, thereby insuring a very tight and snug contiguous relationship between these components when the coupler is finally assembled for routine usage. Thus, when finally assembled, under the preloaded conditions as explained, the diaphragm 16 adds an element of flexurality to the coupler, in that it is free to flex and gradually separate under load conditions that are approaching an overload force, but reseat within itself as the load forces may be lessened. But, it may finally achieve a total disconnection when that designed overload force is finally encountered. And, as previously explained, the number of disc springs 19 applied onto the connecting means 7, and biased together and against the diaphragm 16 by means of the adjustment of the nut 20, generally determines the rather precise force that may be withstood by this coupler before it breaks down.

Figure 9:
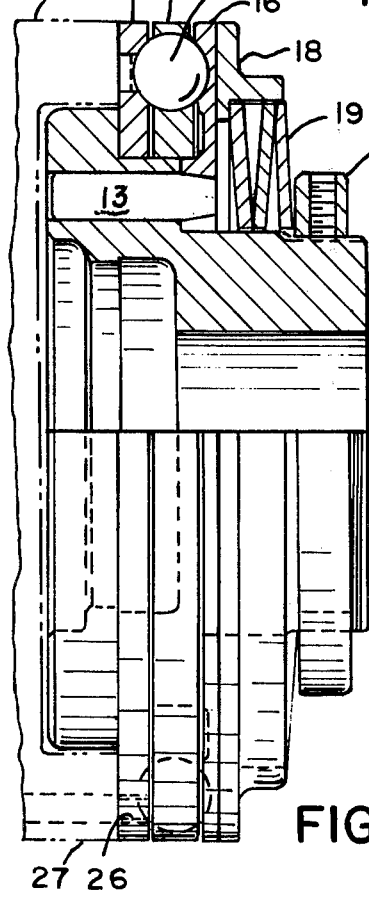
FIG. 9 provides a partial vertical sectional view from the side of a slightly modified coupler of this invention.
Figure 10:
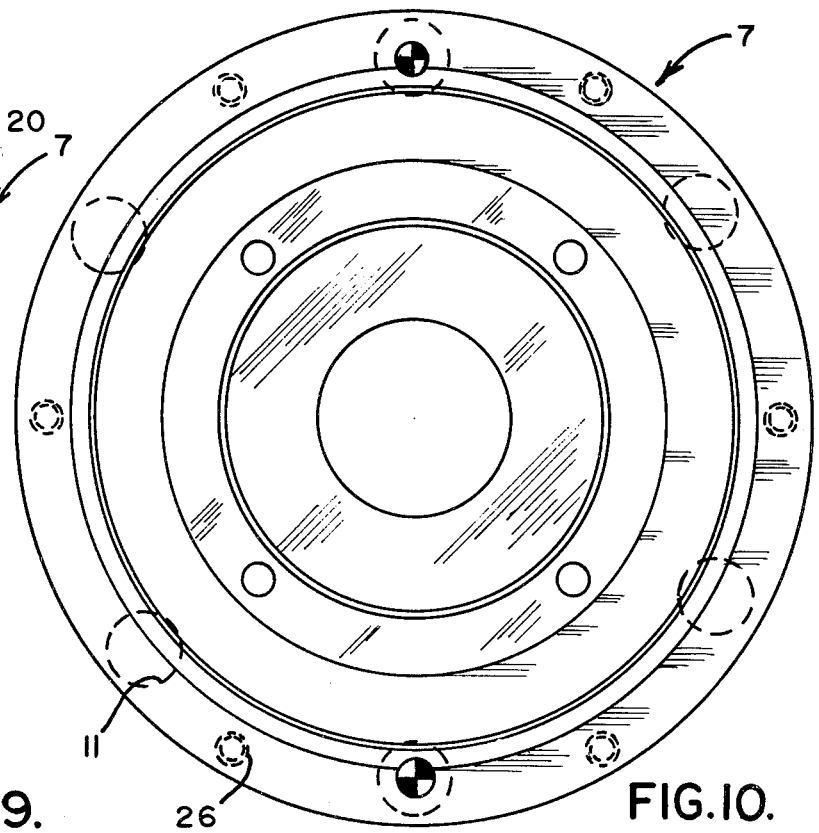
FIG. 10 provides a right side end view of the coupler shown in FIG. 9.

FIGS. 9 and 10 disclose a slight modification in this invention, and wherein its normal operating components, such as the connector 7 having the retainer 12 with its bearings 11, are held intermediate the adapter means 9 and the diaphragm 16 as previously explained. The adapter means 9 includes a series of threads, as at 26, so that the flange portion 27 of a driving member or driven member may be connected therewith so as to provide a rigid connection between this flange 27 and the adapter 9, for the same purposes as previously explained with the manner of attachment of the connecting means 5 to the adapter 9. Thus, in this particular embodiment, the one connecting means will comprise the flange 27, which will be associated with the coupler as a component of the machinery, thereby replacing the type of shaft connection 2 as explained with respect to the machinery parts disclosed in FIG. 1.

Various modifications to the structure and operation of this invention may be envisioned by those skilled in the art upon reviewing the subject matter of this disclosure. Such modifications, if within the spirit and scope of this invention, are intended to be protected by any patent issuing upon this invention. The description of the preferred embodiment set forth is provided for illustrative purposes only. For example, more or less than six bearing means 11 may be utilized in this coupler.

Having thus described the invention what is claimed and desired to be secured by Letters Patent is:

1. A torque limiting coupling assembly for use in connecting rotating and rotatable parts together during normal usage of machinery but effecting disconnecting of said parts when a maximum designed torque is exceeded, comprising, connecting means provided for securement with the said rotating part, a second connecting means provided for securement with the said rotatable part, bearing means, bearing seats operatively associated with each connecting means and for use in seating the bearing means, said bearing means being seated intermediate the two said connecting means and effecting simultaneous turning of said rotatable part by the rotating part during routine operation of the machinery and with the exertion of excessive torque causing a camming action between the bearing means and its bearing seats for effecting an unseating of said bearing means and reduction in the rotation of said rotatable part, a retainer means holding said bearing means between the said connecting means, diaphragm means having one of connecting means formed bearing seats provided thereon cooperating with one of said connecting means for normally seating the said bearing means into position for turning with the revolving of the rotating part, tapered pin means cooperating between the said connecting means and seated within the diaphragm means for assuring the simultaneous rotation of both the said connecting means and bearing means during routine machinery usage, the excessive torque also effecting a camming action between the pin means and its seats tending to cause their movement towards separation, resilient means provided upon the said connecting means and biasing the said diaphragm means against the bearing and pin means, and other bearing seats operatively associated with the said other connecting means and seating the bearing means thereagainst as during designed usage of the said machinery.

2. The invention of claim 1 and wherein said pin means remaining in engagement with the diaphragm means even after separation of the coupling due to an overload condition.

3. The invention of claim 1 wherein each of the said rotating and rotatable parts comprise one of a machinery shaft, flange and dial.

4. The invention of claim 3 and wherein said seating means includes an aperture therein for each of the said pin means, and said pin means being partially inserted within a corresponding seating means aperture during normal usage of the said machinery.

5. The invention of claim 4 wherein that portion of the pin means partially inserting within the said seating means apertures are tapered.

6. The invention of claim 5 wherein the degree of taper provided upon the pin means in cooperation with the extent of seating of the bearing means within the first and second seating means determines the extent of torque accommodated by the rotatable part during designed usage of the machinery.

7. The invention of claim 6 and wherein said resilient means includes at least one disc spring.

8. The invention of claim 6 and wherein said bearing means and first and second seating means are preloaded in their installation.

9. The invention of claim 3 and wherein said second seating means comprises an annular adapter, said adapter being positioned against the second connecting means, and fastener means holding said adapter to the said second connecting means for simultaneous rotation therewith.

10. The invention of claim 9 and wherein said fastener means comprises at least one pin securing between the adapter and the second connecting means.

11. The invention of claim 9 and including a series of bearing seats provided upon the adapter, and each disposed for cooperatively seating a bearing means partially therein during normal operation of the machinery.

12. The invention of claim 3 and including plate means normally disposed against the first seating means, said resilient means comprising spring means, said spring means biasing against the said plate means for urging the seating of the bearing means within the first and second seating means during normal operation of the machinery.

13. The invention of claim 12 and including retainer means provided upon the first connecting means and arranged for holding the spring means thereon.

14. The invention of claim 13 and wherein said retainer means comprises a nut, and said nut being threadedly connectable upon the first said connecting means.

15. The invention of claim 14 and wherein said nut is adjustable in its threaded connection upon the said connecting means, and thereby being capable of varying the pressure of the spring means against the first seating means.

16. The invention of claim 3 wherein said bearing means comprises ball bearings.

* * * * *